(12) United States Patent
Saito

(10) Patent No.: US 10,497,102 B2
(45) Date of Patent: Dec. 3, 2019

(54) IMAGING APPARATUS, CONTROL METHOD AND NON-TRANSITORY STORAGE MEDIUM

(71) Applicant: CANON KABUSHIKI KAISHA, Tokyo (JP)

(72) Inventor: Junichi Saito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/048,610

(22) Filed: Jul. 30, 2018

(65) Prior Publication Data
US 2019/0043175 A1 Feb. 7, 2019

(30) Foreign Application Priority Data
Aug. 2, 2017 (JP) ................. 2017-149675

(51) Int. Cl.
*G02B 7/34* (2006.01)
*G06T 5/00* (2006.01)
*H04N 5/232* (2006.01)

(52) U.S. Cl.
CPC ............ *G06T 5/006* (2013.01); *G02B 7/34* (2013.01); *G02B 7/346* (2013.01); *H04N 5/23248* (2013.01)

(58) Field of Classification Search
CPC ......... G06T 5/006; G02B 7/34; G02B 7/346; G02B 3/0043; H04N 5/23248; G03B 13/36
See application file for complete search history.

(56) References Cited

U.S. PATENT DOCUMENTS

| | | | | |
|---|---|---|---|---|
| 4,816,663 A | * | 3/1989 | Utagawa | G02B 7/346 250/201.2 |
| 4,871,242 A | * | 10/1989 | Sousa | G02B 3/0043 359/707 |
| 8,854,533 B2 | * | 10/2014 | Hamano | G03B 13/36 348/350 |

(Continued)

FOREIGN PATENT DOCUMENTS

| | | |
|---|---|---|
| JP | 4567313 B2 | 10/2010 |
| JP | 2016-057474 A | 4/2016 |

*Primary Examiner* — Hung H Lam
(74) *Attorney, Agent, or Firm* — Cowan, Liebowitz & Latman, P.C.

(57) ABSTRACT

According to an aspect of the invention, an imaging apparatus includes: a focus detection unit configured to execute focus detection based on a phase difference between image signals obtained through photoelectric conversion of a light flux passing through different pupil partial regions of an imaging optical system; a first image blur compensation unit configured to compensate for image blur; a second image blur compensation unit configured to compensate for image blur; and a control unit that controls driving of the first image blur compensation unit and the second image blur compensation unit. The control unit controls a driving amount of the first image blur compensation unit and a driving amount of the second image blur compensation unit such that a change in vignetting occurring in the light flux passing through the imaging optical system is equal to or less than a predetermined value during a period in which the focus detection unit executes the focus detection.

12 Claims, 13 Drawing Sheets

(56) References Cited

U.S. PATENT DOCUMENTS 9,712,747 B2 * 7/2017 Ardo ................. H04N 5/23248
2012/0268613 A1 * 10/2012 Nishio .................. G02B 7/346
348/208.5

* cited by examiner

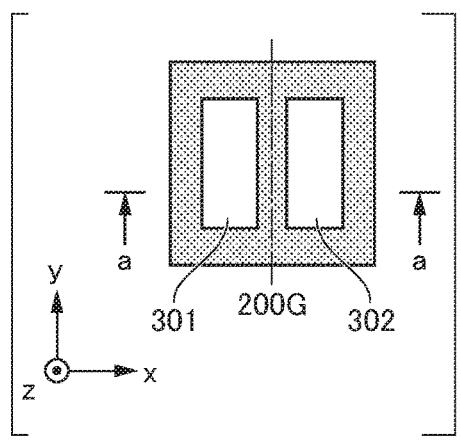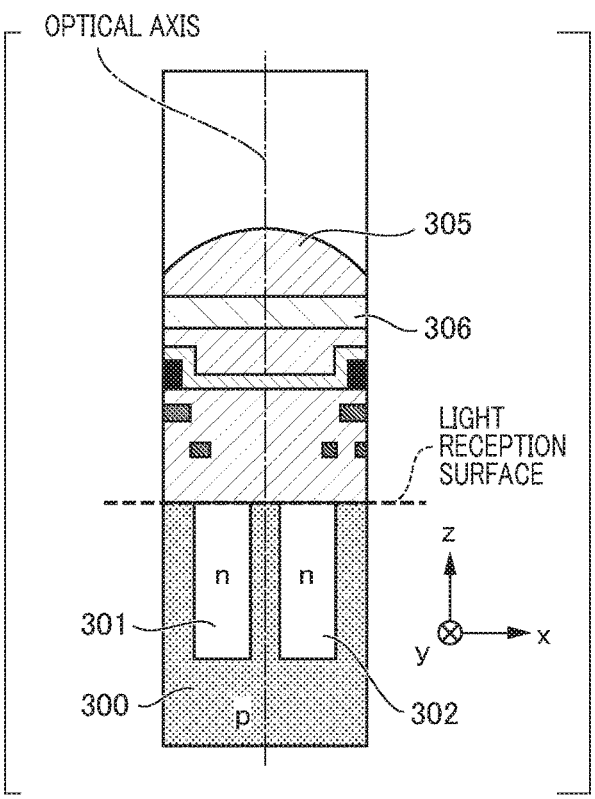

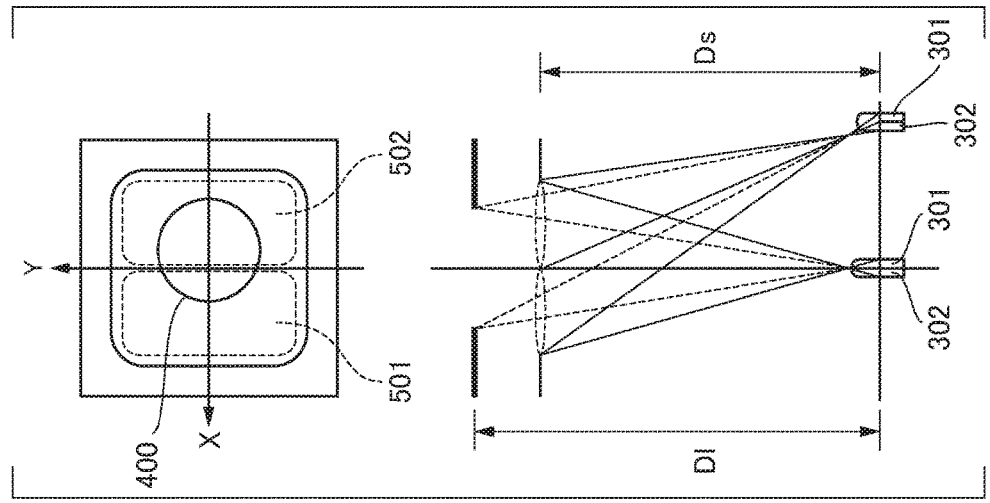
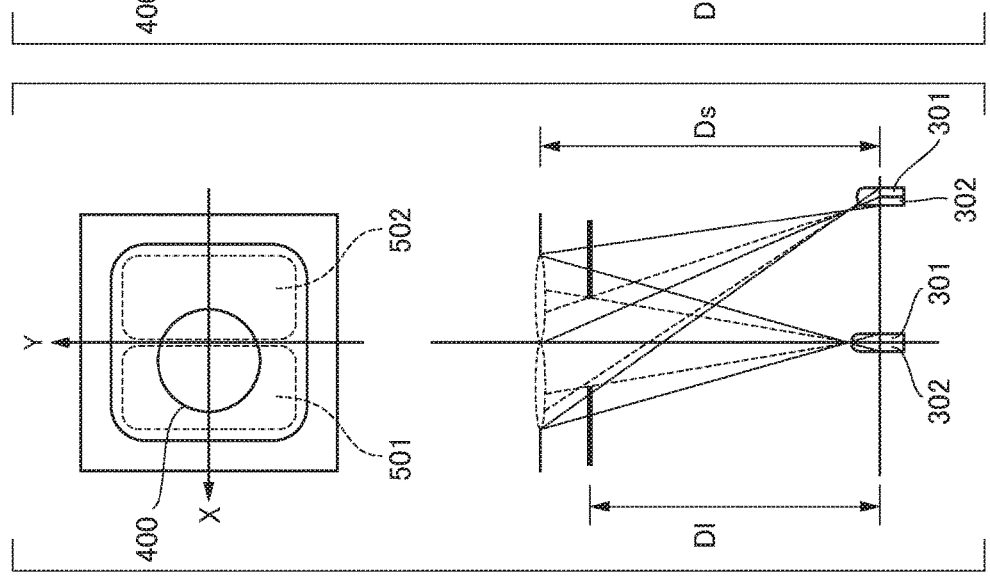
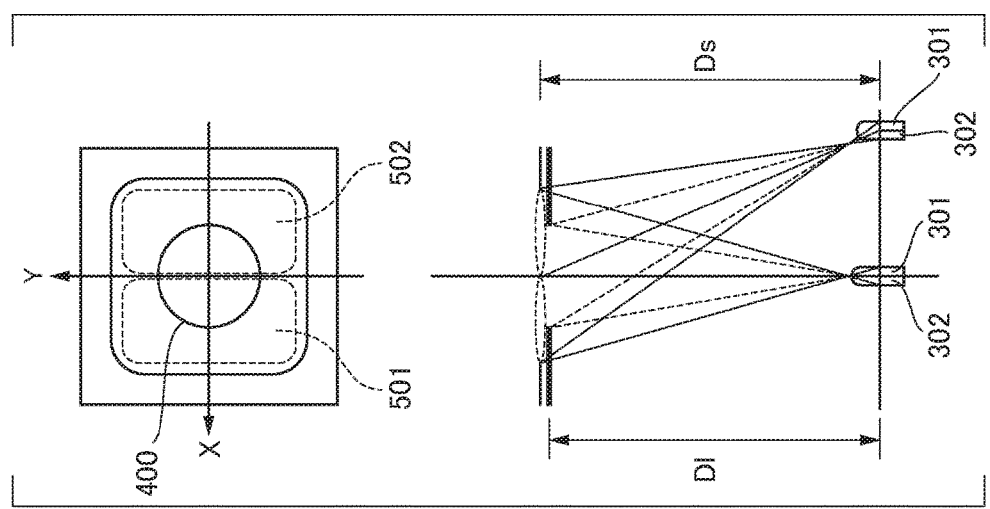

IMAGING APPARATUS, CONTROL METHOD AND NON-TRANSITORY STORAGE MEDIUM

BACKGROUND OF THE INVENTION

Field of the Invention

The present invention relates to an imaging apparatus and a control method.

Description of the Related Art

Japanese Patent Laid-Open No. 2016-57474 discloses an imaging apparatus that includes an image sensor in which focus detection pixels for focus detection are disposed on an imaging surface and executes focus detection based on a phase difference between two imaging signals obtained from different regions of an exit pupil of an imaging optical system. Japanese Patent No. 4567313 discloses a camera that executes image blur compensation by driving a part of an imaging optical system or an image sensor under allocation control.

It is considered possible to accurately assist a photographer with framing by applying an image blur compensation function of the camera disclosed in Japanese Patent No. 4567313 and confining a subject on which the photographer desires to set focus within a focus detection frame within an imaging screen. However, driving the part of the imaging optical system or the image sensor serving as an image blur compensation unit as in the camera is equivalent to substantially changing a positional relation between an optical axis of the imaging optical system and the center of the image sensor. Accordingly, when an image shape compensation unit is driven, a vignetting state occurring in a light flux passing through the imaging optical system is changed equivalently to a change in an image-height of the focus detection frame. As a result, a balance of an amount of light between two imaging signals used to calculate a phase difference is changed, precision of focus detection deteriorates, and even when the photographer can be accurately assisted with framing, an unfocused image may be captured.

SUMMARY OF THE INVENTION

The present invention proposes a technology for preventing an influence of vignetting at the time of focus detection by appropriately controlling an image blur compensation unit.

According to an aspect of the invention, an imaging apparatus comprises: a focus detection unit configured to execute focus detection based on a phase difference between image signals obtained through photoelectric conversion of a light flux passing through different pupil partial regions of an imaging optical system a first image blur compensation unit configured to compensate for image blur; a second image blur compensation unit configured to compensate for image blur; and a control unit that controls driving of the first image blur compensation unit and the second image blur compensation unit. The control unit controls a driving amount of the first image blur compensation unit and a driving amount of the second image blur compensation unit such that a change in vignetting occurring in the light flux passing through the imaging optical system is equal to or less than a predetermined value during a period in which the focus detection unit executes the focus detection.

Further features of the present invention will become apparent from the following description of exemplary embodiments with reference to the attached drawings.

BRIEF DESCRIPTION OF THE DRAWINGS

FIGS. 3A and 3B are explanatory diagrams illustrating a configuration example of pixels of the image sensor.

FIGS. 8A to 8C are explanatory diagrams illustrating a relation between an exit pupil of an imaging optical system and a pupil partial region at a peripheral image-height of the image sensor.

DESCRIPTION OF THE EMBODIMENTS

Figure 1:
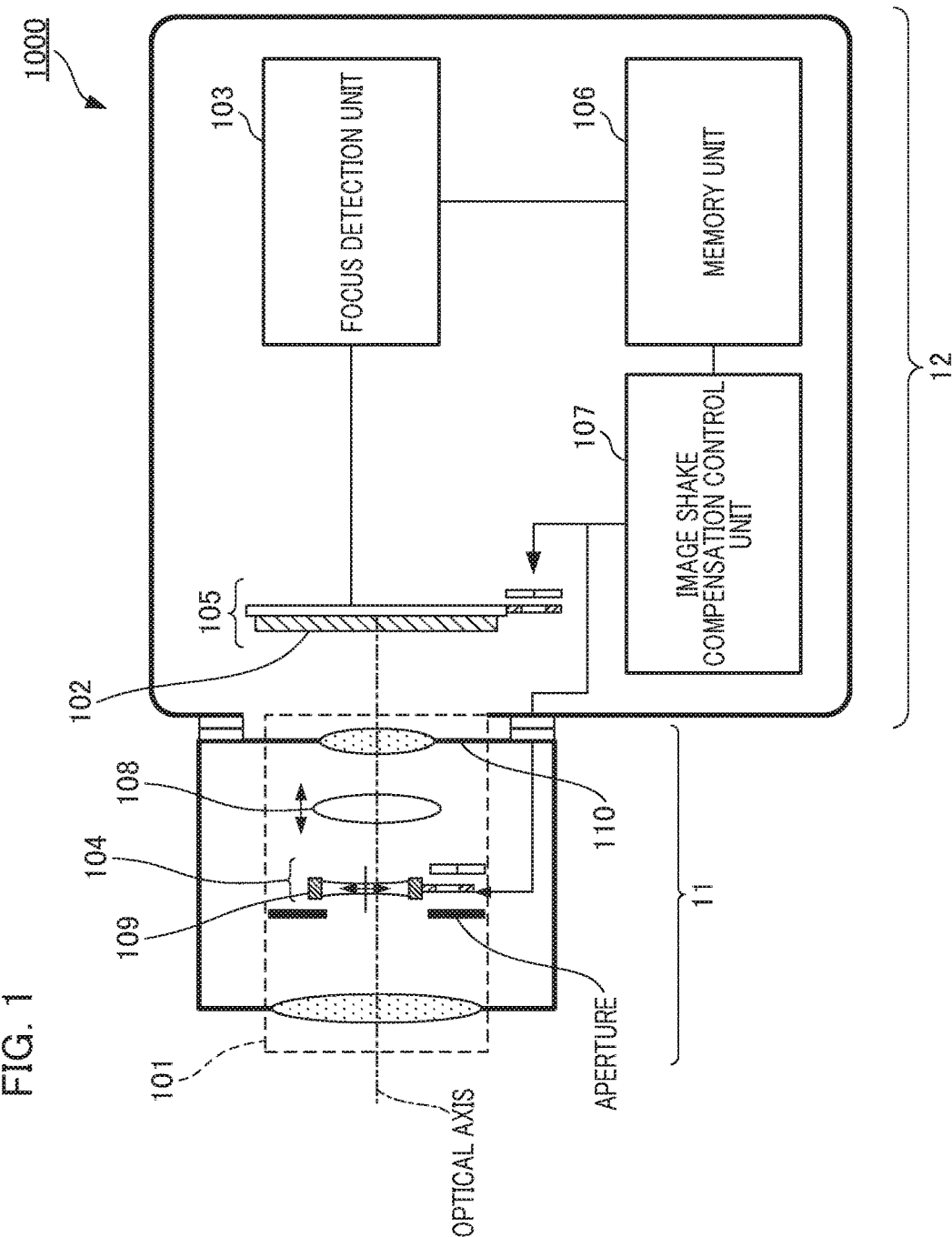
FIG. 1 is a diagram illustrating a configuration example of an imaging apparatus according to an embodiment.

FIG. 1 is a diagram illustrating a configuration example of an imaging apparatus according to an embodiment.

An imaging apparatus 1000 is a lens interchangeable digital camera. In the imaging apparatus 1000, an imaging optical system 101 is disposed inside a mounted interchangeable lens 11 and a light path for an imaging light flux is formed. A light flux passing along the light path arrives at an image sensor 102 disposed in a camera body 12 to be subjected to photoelectric conversion by photodiodes in pixels arrayed in a plane perpendicular to an optical axis in the image sensor 102. An image processing unit executes gamma processing, noise processing, or the like on a signal obtained through the photoelectric conversion to generate image data and write the image data on a nonvolatile memory, thus completing image processing once.

The imaging apparatus 1000 can capture an image in which a desired subject is in an in-focus state by executing focus detection in response to an instruction from a photographer. The pixels disposed in the image sensor 102 also serve as focus detection pixels and a focus detection unit 103 detects an in-focus state of a subject on the basis of an output of the focus detection pixels. Specifically, the focus detection unit 103 executes the focus detection based on a phase difference between a plurality of image signals obtained through the photoelectric conversion of the light flux passing through different pupil partial portions of the imaging optical system. The focus detection unit 103 calculates a driving amount by which a focus adjustment optical system 108 is driven in an optical axis direction based on a detection result of the in-focus state. Then, the focus adjustment optical system 108 is driven by the driving amount in the optical axis direction by a focus adjustment control unit (not illustrated). The details of the focus detection will be described later.

The imaging apparatus 1000 includes a plurality of image blur compensation units that suppress unnecessary vibration of camera blur or the like occurring when the photographer holds the camera to execute imaging. A first image blur compensation unit is a lens shift type image blur compensation unit 104 that includes an image blur compensation optical system 109 which is a part of the imaging optical system 101 disposed inside the interchangeable lens 11. The image blur compensation optical system 109 is a concave lens disposed closer to an image surface side than an aperture. An image blur compensation control unit 107 controls the lens shift type image blur compensation unit 104 such that the image blur compensation optical system 109 is subjected to shift driving on the plane perpendicular to the optical axis to compensate for image blur.

Image blur compensation is executed through lens shift in the embodiment, but a method of compensating for image blur is not limited to the lens shift. The image blur compensation may be executed by swinging the whole imaging optical system 101. Alternatively, the image blur compensation may be executed in accordance with a change in a prism angle of a variable prism which is a part of the imaging optical system 101.

A second image blur compensation unit is a sensor shift type image blur compensation unit 105 that executes image blur compensation by retaining the image sensor 102 to be movable on the plane perpendicular to the optical axis and driving the image sensor 102. In the embodiment, a region in which the image blur compensation is possible is expanded by using the two image blur compensation units so that stabilization of a captured image is achieved. A retention frame 110 is a mechanical structure of a lens barrel that retains a final group of the imaging optical system 101. In a high image-height region or the like distant from the optical axis of the image sensor, so-called "vignetting" in which an imaging light flux is blocked by the mechanical structure of the retention frame 110 or the like occurs and affects the focus detection. Accordingly, at the time of focus detection, the imaging apparatus 1000 controls a driving amount of the lens shift type image blur compensation unit 104 and the sensor shift type image blur compensation unit 105 (executes allocation control) such that a change of the vignetting is equal to or less than a predetermined value using information regarding the vignetting in the memory unit 106. The vignetting will be described later.

Figure 2:
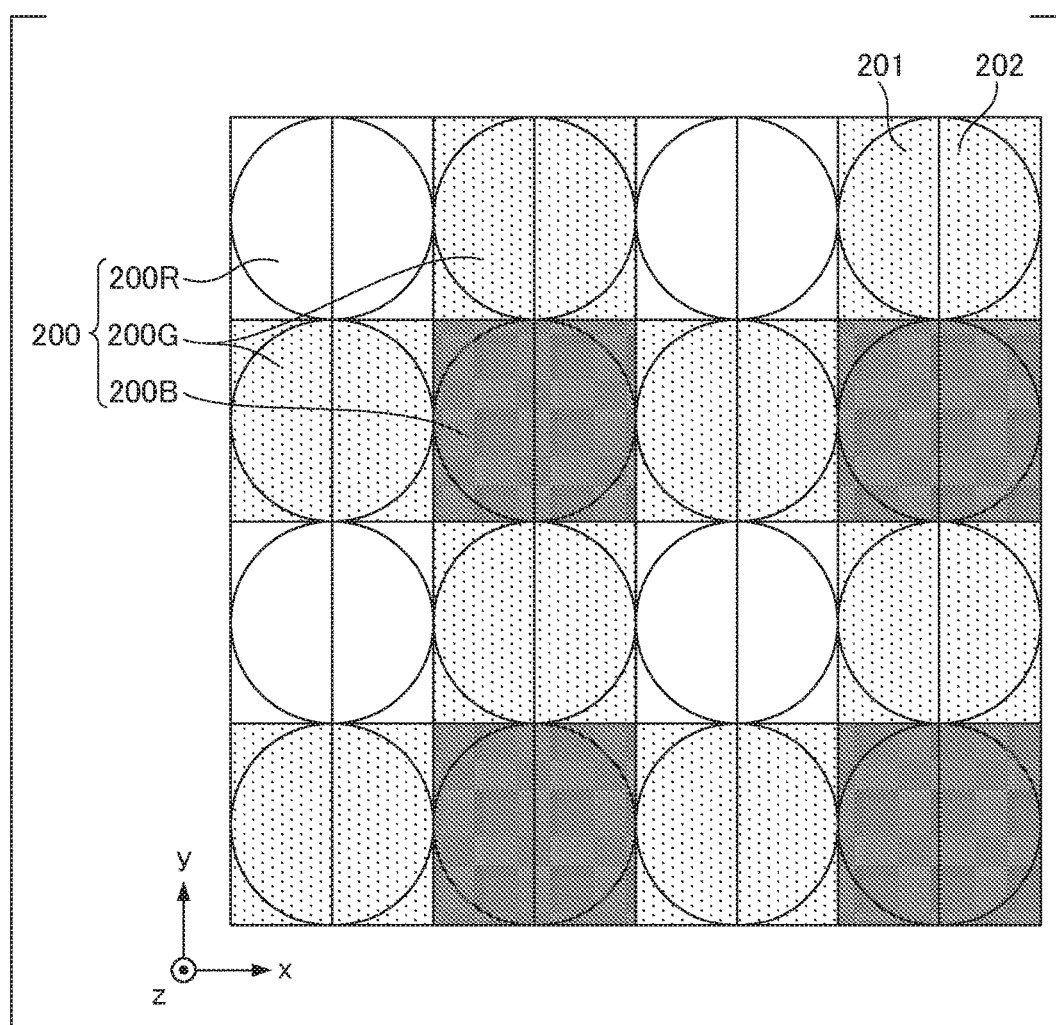
FIG. 2 is a diagram illustrating an example of pixel arrangement of an image sensor.

FIG. 2 is a diagram illustrating a pixel array of the image sensor 102 of the imaging apparatus 1000 in a range of 4 columns×4 rows and illustrating a focus detection pixel array in a range of 8 columns×4 rows.

In a pixel group 200 of 2 columns×2 rows illustrated in FIG. 2, a pixel 200R with spectral sensitivity of red (R) at the top left position is disposed at the top left. In addition, pixels 200 G with spectral sensitivity of green (G) are disposed at the top right and bottom left. In addition, a pixel 200B with spectral sensitivity of blue (B) is disposed at the bottom right. Further, each pixel includes a first focus detection pixel 201 and a second focus detection pixel 202 arrayed in 2 columns×1 row.

By disposing a plurality of pixels of 4 columns×4 rows (focus detection pixels of 8 columns×4 rows) on a surface, it is possible to acquire a captured image (a focus detection signal). In the embodiment, an image sensor that has a pixel period P of 4 μm and a number of pixels N in 5575 horizontal columns×3725 vertical rows=about 20.75 million pixels or a pixel period PAF of 2 μm of focus detection pixels in the column direction and a number of focus detection pixels NAF in 11150 horizontal columns×3725 vertical rows=about 41.50 million pixels will be described.

FIGS. 3A and 3B are explanatory diagrams illustrating a configuration example of pixels of the image sensor.

FIG. 3A illustrates one of the pixels 200G of the image sensor 102 illustrated in FIG. 2 when viewed from the side of the light reception surface (the +z side) of the image sensor 102. FIG. 3B illustrates the cross section taken along the line a-a of FIG. 3A when viewed from the −y side. The "optical axis" described in FIG. 3B indicates an optical axis of a microlens 305.

As illustrated in FIGS. 3A and 3B, the microlens 305 that condenses incident light on the light reception side of each pixel is formed in the pixel 2000 and a photoelectric conversion portion 301 and a photoelectric conversion portion 302 partitioned by NH partition (two-partitioned) in the x direction and by NV partition (one-partitioned) in the y direction are formed. The photoelectric conversion portion 301 and the photoelectric conversion portion 302 correspond to a first focus detection pixel 201 and a second focus detection pixel 202, respectively. The photoelectric conversion portion 301 and the photoelectric conversion portion 302 may be photodiodes with a pin-structure in which an intrinsic layer is interposed between a p-type layer and an n-type layer or may be pn-junction photodiodes in which an intrinsic layer is omitted as necessary.

In each pixel, a color filter 306 is formed between the microlens 305 and each of the photoelectric conversion portion 301 and the photoelectric conversion portion 302. In addition, spectral transmittance of the color filter may be changed for each pixel or the color filter may be omitted as necessary.

Light incident on the pixel 200G is condensed by the microlens 305, subjected to spectroscopy by the color filter 306, and subsequently received by the photoelectric conversion portion 301 and the photoelectric conversion portion 302. In the photoelectric conversion portion 301 and the photoelectric conversion portion 302, pairs of holes and electrons are generated in accordance with an amount of received light and are separated in a depletion layer. Subsequently, the negatively charged electrons are stored in an n-type layer (not illustrated) while the holes are discharged to the outside of the image sensor via a p-type layer connected to a constant voltage source (not illustrated). The electrons stored in the n-type layer (not illustrated) of the photoelectric conversion portion 301 and the photoelectric conversion portion 302 are transmitted to an electrostatic capacitance portion (FD) via a transmission gate to be converted into a voltage signal.

Figure 4:
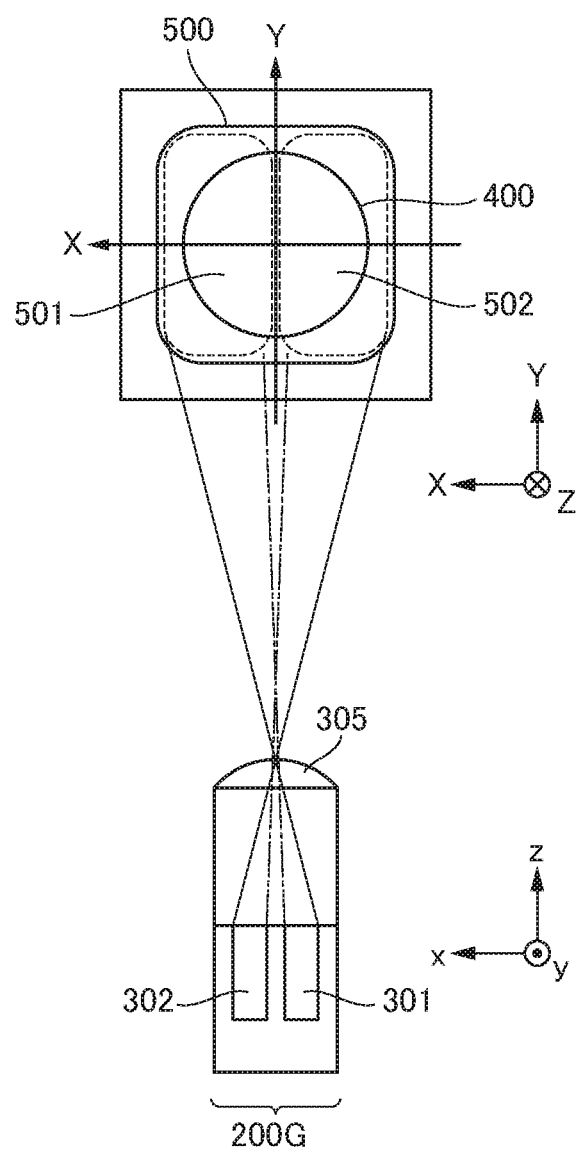
FIG. 4 is an explanatory diagram illustrating a correspondent relation between pupil partition and a pixel structure of the image sensor.

FIG. 4 is an explanatory diagram illustrating a correspondent relation between pupil partition and a pixel structure of the image sensor.

FIG. 4 illustrates a cross section along the line a-a of the pixel structure illustrated in FIG. 3A from the +y side and an exit pupil surface of the imaging optical system 101. To cause the x and y axes of the cross-sectional view to correspond to the coordinate axes of the exit pupil surface, the x and y axes are reversed compared to FIGS. 3A and 3B.

A first pupil partial region 501 of the first focus detection pixel 201 has a center having a general conjugate relationship with the light reception surface of the photoelectric conversion portion 301 eccentric in the −x direction and the microlens 305 and is a pupil region in which light can be received by the first focus detection pixel 201. The center of the first pupil partial region 501 of the first focus detection pixel 201 is eccentric on the +X side on the pupil surface.

A second pupil partial region 502 of the second focus detection pixel 202 has a center having a general conjugate relationship with the light reception surface of the photoelectric conversion portion 302 eccentric in the +x direction and the microlens 305 and is a pupil region in which light can be received by the second focus detection pixel 202. The center of the second pupil partial region 502 of the second focus detection pixel 202 is eccentric on the −X side on the pupil surface. The exit pupil 400 is formed by an opening of an aperture of the imaging optical system 101. A light flux inside the region of the exit pupil 400 reaches the image sensor 102. The pupil region 500 is a pupil region in which light can be received by the whole pixel 200G in which the photoelectric conversion portion 301 and the photoelectric conversion portion 302 (the first focus detection pixel 201 and the second focus detection pixel 202) are combined.

Figure 5:
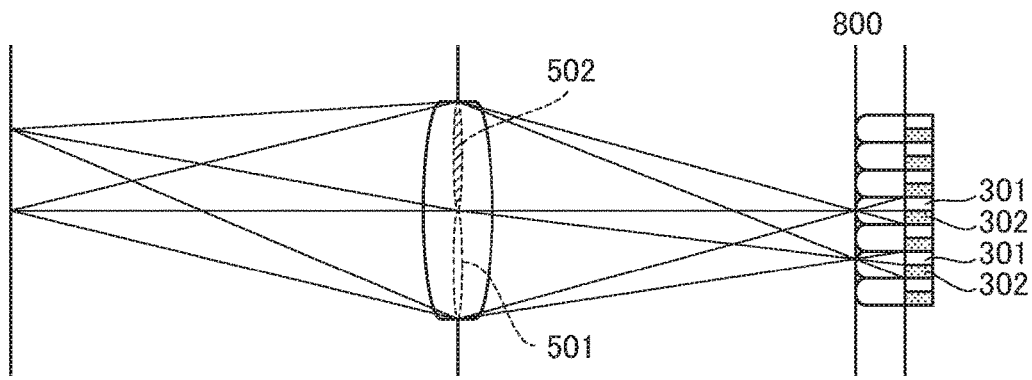
FIG. 5 is an explanatory diagram illustrating a correspondent relation between the pupil partition and the image sensor.

FIG. 5 is an explanatory diagram illustrating a correspondent relation between the pupil partition and the image sensor.

Light fluxes passing through different pupil partial regions which are the first pupil partial region 501 and the second pupil partial region 502 are incident at different angles on each pixel of the image sensor 102 to be received by the first focus detection pixel 201 and the second focus detection pixel 202 partitioned by 2x1. In the embodiment, the pupil region is partitioned into two pupils in the horizontal direction. The pupil region may be partitioned in the vertical direction as necessary.

In the image sensor 102, the plurality of first focus detection pixels 201 that receive the light flux passing through the first pupil partial regions of the imaging optical system 101 and the plurality of second focus detection pixels 202 that receive the light flux passing through the second pupil partial regions of the different imaging optical system 101 from the first pupil partial region are arrayed. In the image sensor 102, a plurality of imaging pixels receiving the light fluxes passing through the pupil regions in which the first pupil partial regions and the second pupil partial regions of the imaging optical system 101 are combined are arrayed. In the embodiment, each imaging pixel includes the first focus detection pixel and the second focus detection pixel. The imaging apparatus 1000 collects a light reception signal of the first focus detection pixel 201 of each pixel of the image sensor 102 to generate a first focus signal. In addition, the imaging apparatus 1000 collects a light reception signal of the second focus detection pixel 202 of each pixel to generate a second focus signal. Then, the imaging apparatus 1000 executes focus detection based on the first focus signal and the second focus signal. The imaging apparatus 1000 generates an imaging signal with a resolution of an effective number of pixels N by adding signals of the first focus detection pixel 201 and the second focus detection pixel 202 for each pixel of the image sensor 102.

Figure 6:
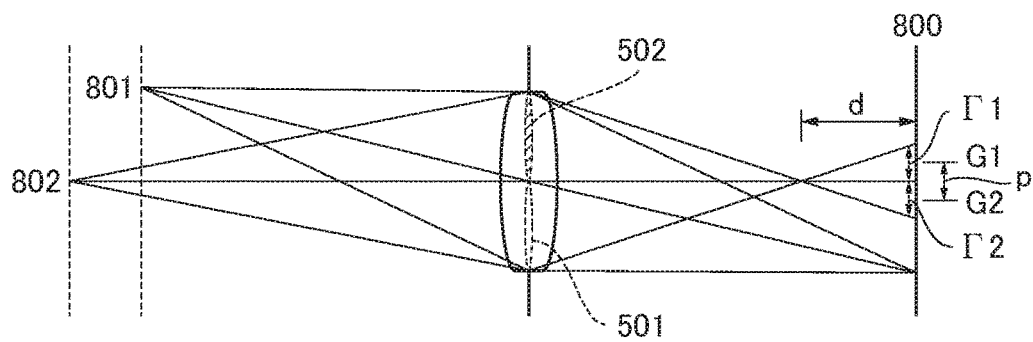
FIG. 6 is an explanatory diagram illustrating a relation between a defocus amount and an image blur amount.

FIG. 6 is an explanatory diagram illustrating a relation of a defocus amount between the first focus detection signal and the second focus detection signal and an image blur amount between the first focus detection signal and the second focus detection signal.

The image sensor 102 (not illustrated) of the imaging apparatus 1000 is disposed on an imaging surface 800. As in FIGS. 4 and 5, the exit pupil of the imaging optical system 101 is partitioned into the first pupil partial region 501 and the second pupil partial region 502.

A defocus amount d is defined by setting a distance from an image formation position of a subject to the imaging surface as a magnitude |d| and a front focal state in which the image formation position of the subject is located closer to the side of the subject than the imaging surface as a negative sign (d<0). In addition, the defocus amount d is defined by setting a rear focal state in which the image formation position of a subject is located closer to the opposite side to the subject than the imaging surface as a positive sign (d>0).

In a focal state in which the image formation position of a subject is located on the imaging surface (focal position), d=0 is satisfied. In FIG. 6, a subject 801 is in the focal state (d=0). A subject 802 is in a front focal state (d<0). The front focal state (d<0) and the rear focal state (d>0) are defocus states (|d|>0).

In the front focal state (d<0), a light flux passing through the first pupil partial region 501 (the second pupil partial region 502) in the light flux from the subject 802 is condensed once, subsequently spreads with a width Γ1 (Γ2) centering on a central position G1 (G2) of the light flux, and becomes a blurred image on the imaging surface 800. The blurred image is received as light by the first focus detection pixel 201 (the second focus detection pixel 202) included in each of the pixels arrayed in the image sensor 102, so that the first focus detection signal (the second focus detection signal) is generated. Accordingly, for the subject 802, the first focus detection signal (the second focus detection signal) is recorded as a blurred subject image with the burr width Γ1 (Γ2) at the central position G1 (G2) on the imaging surface 800. The burr width Γ1 (Γ2) of the subject image generally increases in proportion to an increase of the magnitude |d| of the defocus amount d. Similarly, a magnitude |p| of an image blur amount p (=a difference G1−G2 of the central position of the light flux) of the subject image between the first focus detection signal and the second focus detection signal also increases in proportion to an increase in the magnitude |d| of the defocus amount d. In the rear focal state (d>0), the same applies except that the image blur direction of the subject image between the first focus detection signal and the second focus detection signal is opposite to the front focal state. Accordingly, the magnitude of the image blur amount between the first focus detection signal and the second focus detection signal increases with an increase in the magnitude of the defocus amount between the first focus detection signal and the second focus detection signal or the imaging signal obtained by adding the first focus detection signal and the second focus detection signal.

The imaging apparatus according to the embodiment executes focus detection of a phase difference scheme using relevance between the image blur amount and the defocus amount between the first focus detection signal and the second focus detection signal. Specifically, the focus detection unit 103 calculates a correlation amount indicating the degree of signal matching by relatively shifting the first focus detection signal and the second focus detection signal and detects an image blur amount from a shift amount with good correlation. The focus detection unit 103 executes the focus detection by converting the image blur amount into a detection defocus amount from relevance in which the magnitude of the image blur amount between the first focus detection signal and the second focus detection signal increases with an increase in the magnitude of the defocus amount of the imaging signal.

Figure 7:
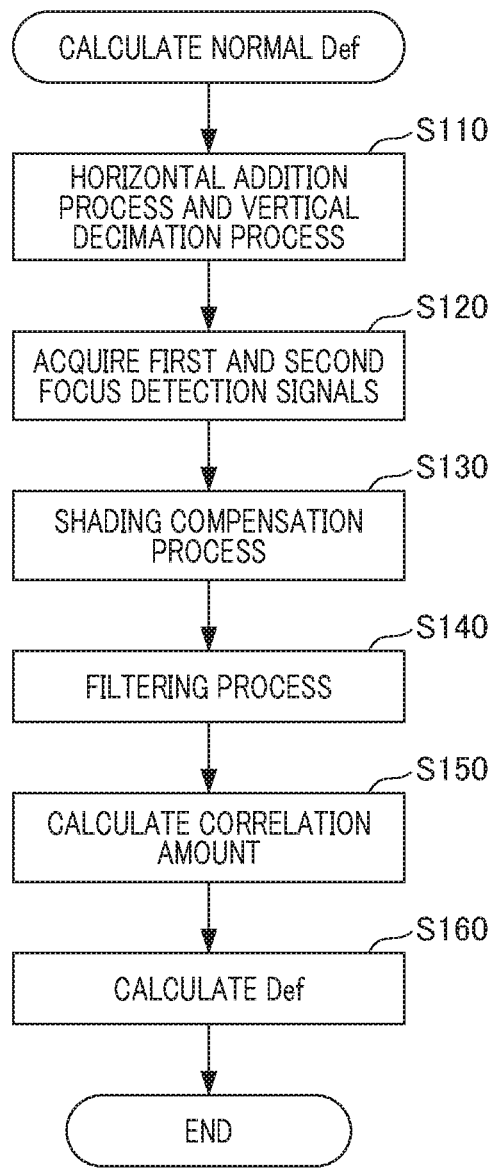
FIG. 7 is a flowchart illustrating an example of a focus detection process.

FIG. 7 is a flowchart illustrating an example of a focus detection process.

In S110, the focus detection unit 103 executes a 3-pixel addition process in the column direction on each of the first focus detection signal and the second focus detection signal to suppress a signal data amount. The focus detection unit 103 performs a Bayer (RGB) addition process to convert an RGB signal into a luminance Y signal. The focus detection unit 103 performs a vertical decimation process in which 1-row reading is executed every 3 rows. In the embodiment, the horizontal addition and the vertical decimation process are executed after reading from the image sensor 102. However, the horizontal addition and the perpendicular decimation process may be executed in advance in the image sensor 102.

In S120, the focus detection unit 103 sets a focus detection region which is a target on which focus is adjusted in an effective pixel region of the image sensor 102. The focus detection unit 103 generates the first focus detection signal from a light reception signal of the first focus detection pixel in the focus detection region and generates the second focus detection signal from a light reception signal of the second focus detection pixel in the focus detection region.

Subsequently, in S130, the focus detection unit 103 executes a shading compensation process on each of the first focus detection signal and the second focus detection signal. Hereinafter, shading by pupil blur of the first focus detection signal and the second focus detection signal will be described, FIGS. 8A to 8C are explanatory diagrams illustrating a relation between an exit pupil of an imaging optical system and a pupil partial region at a peripheral image height of the image sensor.

A relation between the exit pupil 400 of the imaging optical system 101, and the first pupil partial region 501 of the first focus detection pixel 201 and the second pupil partial region 502 of the second focus detection pixel 202 at a peripheral image height of the image sensor 102 will be described as an example with reference to FIGS. 8A to 8C. FIG. 8A illustrates a state in which an exit pupil distance Dl of the imaging optical system 101 is identical to a setting pupil distance Ds of the image sensor 102. In this state, the exit pupil 400 of the imaging optical system 101 is partitioned substantially equally into the first pupil partial region 501 and the second pupil partial region 502. FIG. 8B illustrates a state in which the exit pupil distance Dl of the imaging optical system 101 is shorter than the setting pupil distance Ds of the image sensor 102. In this state, at the peripheral image height of the image sensor 102, pupil blur between the exit pupil 400 and an entrance pupil of the image sensor 102 occurs, and thus the exit pupil 400 is partitioned unequally. FIG. 8C illustrates a state in which the exit pupil distance Dl of the imaging optical system 101 is longer than the setting pupil distance Ds of the image sensor 102. In this state, at the peripheral image height of the image sensor 102, pupil blur between the exit pupil 400 and the entrance pupil of the image sensor 102 occurs, and thus the exit pupil 400 is partitioned unequally. Because the pupil partition at the peripheral image height is unequal, intensity of the first focus detection signal and intensity of the second focus detection signal are unequal. Thus, shading in which intensity of one of the first focus detection signal and the second focus detection signal increases and the intensity of the other focus detection signal decreases occurs.

The description will now return to FIG. 7. In S130, the focus detection unit 103 generates a first shading compensation coefficient of the first focus detection signal and a second shading compensation coefficient of the second focus detection signal. The focus detection unit 103 generates the first shading compensation coefficient and the second shading compensation coefficient in accordance with an image height of the focus detection region, an F number (aperture value) of the imaging optical system 101, an exit pupil distance, and a vignetting state of an exit pupil light flux. The focus detection unit 103 multiplies the first focus detection signal by the first shading compensation coefficient and multiplies the second focus detection signal by the second shading compensation coefficient and executes the shading compensation process on the first focus detection signal and the second focus detection signal.

In the focus detection of the phase difference scheme, a detection defocus amount is detected on the basis of the correlation between the first focus detection signal and the second focus detection signal. When shading occurs due to pupil blur, correlation between the first focus detection signal and the second focus detection signal deteriorates in some cases. Accordingly, in the focus detection of the phase difference scheme, to improve the correlation (the degree of signal matching) between the first focus detection signal and the second focus detection signal and improve focus detection performance, it is preferable to execute the shading compensation process (an optical compensation process). Although not illustrated in FIGS. 8A to 8C, in addition to the opening included in the exit pupil 400, a mechanical member holding each optical system or a mechanical member from the final group of the interchangeable lens 11 to the image sensor 102 is inside the camera body. Depending on the aperture value, the image height, or the like, a light flux passing through the imaging optical system is blocked by the mechanical member in some cases, which is generally referred to as "vignetting" of the light flux.

The shading of the first focus detection signal and the second focus detection signal also occurs due to the vignetting. Under the condition that the vignetting is known, shading compensation is also executed in addition to the vignetting to prevent focus detection precision from deteriorating. In the imaging apparatus 1000, a memory unit 106 stores a shading compensation coefficient SHD as a table in which a shading compensation coefficient SHD corresponds to the image height of the focus detection region, an F number (aperture value) of the imaging optical system 101, an exit pupil distance, and a vignetting state. The shading compensation coefficient SHD corresponds to an intensity ratio between a plurality of image signals obtained from mutually different regions of the exit pupil of the imaging optical system. Since the exit pupil distance is a different value for each interchangeable lens (for each zoom state in a zoom lens), a table corresponding to each exit pupil distance is provided. Since the vignetting state is changed in accordance with the position of the image blur compensation optical system 109, the vignetting state is expressed by giving the shading compensation coefficient SHD for each stroke amount of the image blur compensation optical system 109. In the imaging apparatus 1000, vignetting information is retained by giving a different table of the shading compensation coefficient SHD for each stroke amount of the lens shift type image blur compensation unit 104. A position of the image sensor 102 driven by the sensor shift type image blur compensation unit 105 can be ascertained as a simple change in an image height of a focus detection region. Accordingly, the imaging apparatus 1000 does not retain the shading compensation coefficient table for each position of the image sensor 102. For example, the imaging apparatus 1000 retains a relative positional relation assumed in driving of the lens shift type image blur compensation unit 104 and the sensor shift type image blur compensation unit 105 as a stroke amount of the image blur compensation optical system 109 above-described. In S140, the focus detection unit 103 executes a filtering process on the first focus detection signal and the second focus detection signal.

Figure 9:
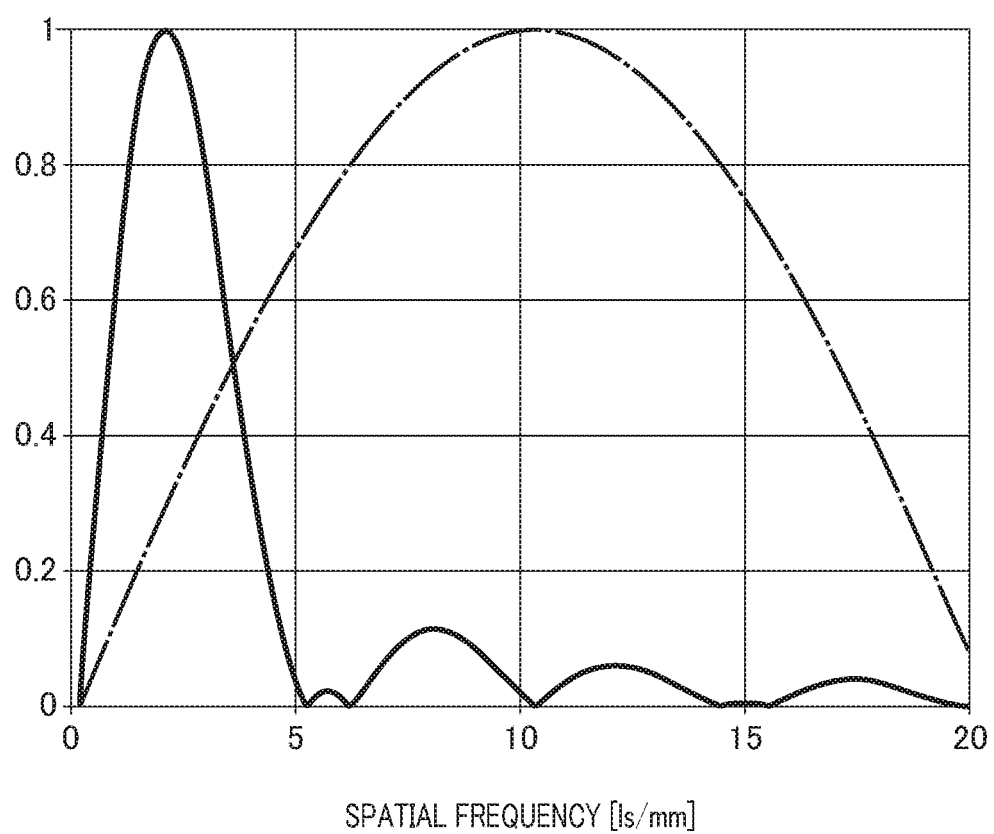
FIG. 9 is an explanatory diagram illustrating an example of a pass band of a filtering process.

FIG. 9 is an explanatory diagram illustrating an example of a pass band of a filtering process.

A solid line of FIG. 9 indicates a pass band of the filtering process. In the embodiment, since the focus detection in a large defocus state is executed through focus detection of the phase difference scheme, the pass band of the filtering process includes a low-frequency band. When the focus adjustment is executed from a large defocus state to a small defocus state, the pass band of the filtering process at the time of focus detection may be adjusted to a higher frequency band as indicated by a one-dot chain line of FIG. 9 in accordance with a defocus state.

Subsequently, in S150 of FIG. 7, the focus detection unit 103 calculates a correlation amount indicating the degree of signal matching by executing a shifting process of relatively shifting the first focus detection signal and the second focus detection signal after the filtering process in a pupil partition direction. It is assumed that A(k) is a k-th first focus detection signal after the filtering process, B(k) is a k-th second focus detection signal, and W is a range of a number k corresponding to the focus detection region. A correlation amount COR is calculated as in Expression (1) by setting s1 as a shift amount by the shifting process and Γ1 as a shift range of the shift amount s1.

$$COR(s_1) = \sum_{k \in W} |A(k) - B(k - s_1)|, s_1 \in \Gamma 1 \quad (1)$$

The focus detection unit 103 generates a shift subtraction signal by causing the k-th first focus detection signal A(k) and a k-s1-th second focus detection signal B(k-s1) to correspond to each other and executing subtraction through the first shifting process of the shift amount s1. The focus detection unit 103 calculates an absolute value of the generated shift subtraction signal, takes a sum of numbers k within a range W corresponding to the focus detection region, and calculates a correlation amount (first evaluation value) COR(s1). The correlation amount (the first evaluation value) calculated for each row may be added over a plurality of rows for each shift amount as necessary.

In S160, the focus detection unit 103 calculates a shift amount of a real number value at which the correlation amount is a minimum value through subpixel calculation from the correlation amount and sets the shift amount as an image blur amount p1. The focus detection unit 103 detects a detection defocus amount (Def) by multiplying the image blur amount p1 by an image height of the focus detection region, the F number of the imaging optical system 101, and a conversion factor K suitable for the exit pupil distance and the vignetting information. That is, the phase difference between the plurality of image signals is converted into a defocus amount in accordance with the conversion factor K. The conversion factor K is present as table data stored in the memory unit 106 included in the imaging apparatus 1000. A table of the conversion factor K is provided as a table in accordance with the exit pupil distance for each interchangeable lens, like the table of the shading compensation coefficient SHD. For the vignetting state, similarly, the conversion factor K is described for each stoke amount of the image blur compensation optical system 109. The imaging apparatus 1000 has the table of the conversion factor K different for each stroke amount of the image blur compensation optical system 109, and thus retains the vignetting information. The focus detection unit 103 determines a driving amount of the focus adjustment optical system 108 by multiplying the detected detection defocus amount by focus sensitivity.

In a still image photographing mode, the process described with reference to FIG. 7 is executed for each frame until the focus detection for confirming focus is completed from an instruction in a half-push operation (SW1) of a shutter button (not illustrated). In a moving image photographing mode, this process is executed for each frame. The image height of the focus detection region is predicted and determined from a history of tracking (automatic selection of a focus detection frame) or a history of driving positions of two image blur compensation units in a plurality of previous frames.

In the embodiment, the shading compensation coefficient SHD and the conversion factor K are stored in the form of the table in the memory unit 106, but the vignetting information may be retained as a 2-dimensional frame shape of a pupil surface and coefficient calculation may be executed on the basis of the vignetting information to obtain the coefficient in the camera. The 2-dimensional frame shape is equivalent to the shape of the light flux on the exit pupil surface of the imaging optical system in accordance with the vignetting state. In the embodiment, the location of the memory unit 106 is not particularly described, but the memory unit 106 may be included in the camera body 12 or may be separately provided in the interchangeable lens 11 and the camera body 12.

Lens Shift Compensation and Pupil Partition

A relation between the focus detection and the driving of the lens shift type image blur compensation unit 104 and the sensor shift type image blur compensation unit 105 which are image blur compensation units of the imaging apparatus 1000 will be described with reference to FIGS. 10A to 13B.

FIGS. 10A to 13B are diagrams illustrating examples of a pupil partition state on an exit pupil surface which is observed by a pixel group of the focus detection region of a central image height or a peripheral image height.

Figure 10A:
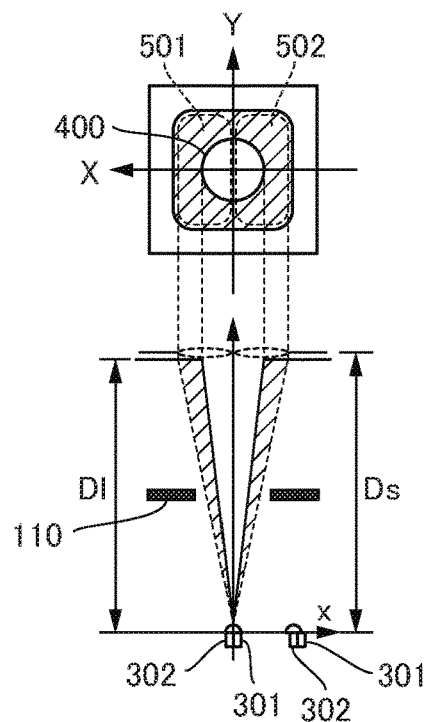
FIGS. 10A to 10D are diagrams illustrating examples of a pupil partition state on an exit pupil surface.
Figure 10B:
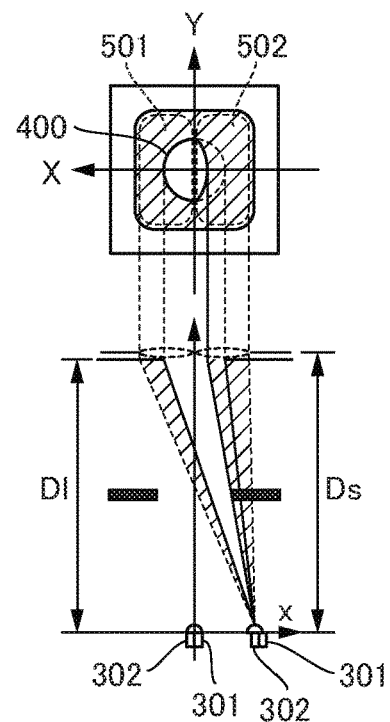
Figure 10C:
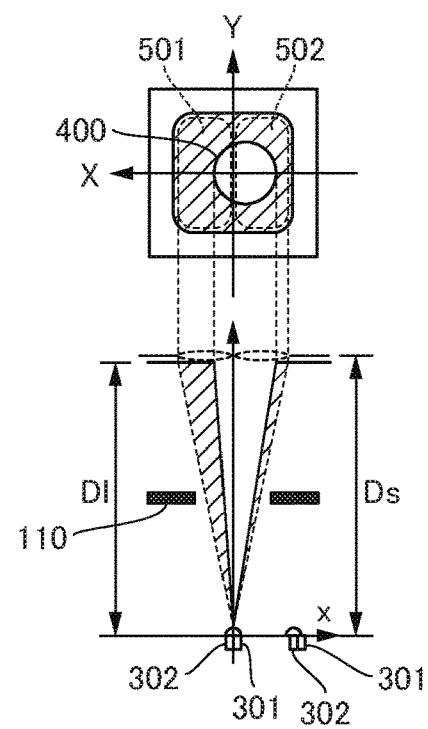
Figure 10D:
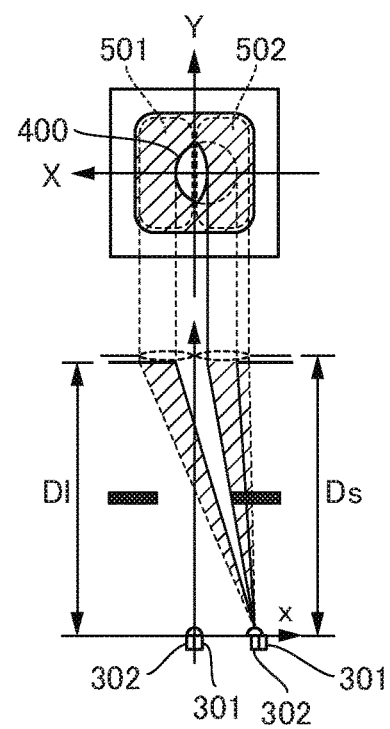
Figure 11A:
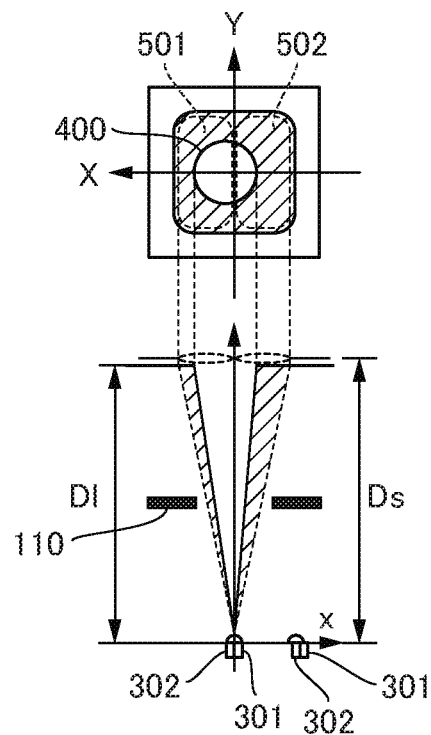
FIGS. 11A and 11B are diagrams illustrating examples of the pupil partition state on the exit pupil surface.
Figure 11B:
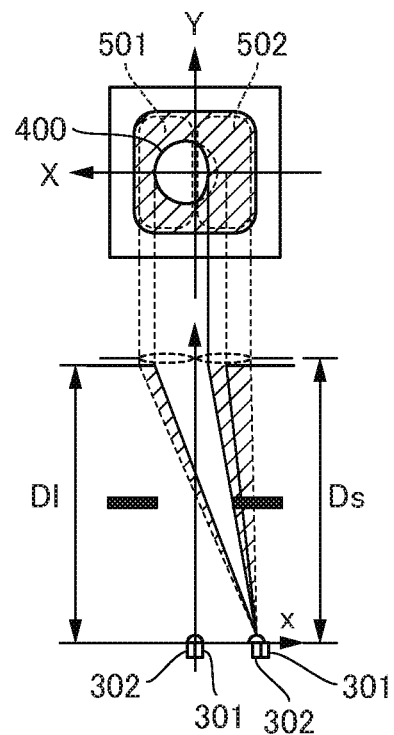

FIGS. 10A, 10C, and FIG. 11A illustrate a pupil partition state on the exit pupil surface which is observed by a pixel group of the focus detection region at the central image height. FIGS. 10B, 10D, and FIG. 11B illustrate a pupil partition state on the exit pupil surface which is observed by a pixel group of the focus detection region at the peripheral image height (the +X direction). FIGS. 10A to 10D illustrates a system in which the exit pupil distance Dl of the imaging optical system 101 is substantially equal to the setting pupil distance Ds of the image sensor 102.

Pupil partition at the central image height when the image blur compensation optical system 109 included in the lens shift type image blur compensation unit 104 is located in the middle of a driving range will be described with reference to FIG. 10A. A circular shape shown at the middle of the pupil surface on the upper side of FIG. 10A is the exit pupil 400 formed by the opening of the aperture of the imaging optical system 101. At the central image height, it can be understood that a light flux on the exit pupil surface of the imaging optical system 101 at substantially the same distance as the setting pupil distance of the image sensor 102 is substantially equally partitioned to the right and left. Bold lines disposed between the surfaces of the image sensor 102 and the exit pupil 400 indicate the retention frame 110 of the final group of the imaging optical system 101. At the central image height, no vignetting occurs due to the retention frame 110.

As illustrated in FIG. 10B, even at the peripheral image height, the setting pupil distance of the image sensor 102 is substantially the same as the exit pupil distance of the imaging optical system 101. When there is no retention frame 110 of the final group, the light flux on the exit pupil surface of the imaging optical system 101 can be substantially equally partitioned to the right and left. However, actually one light flux causes vignetting due to the retention frame 110 of the final group and the pupil partition may be right and left unequal. When the vignetting is caused, the imaging apparatus 1000 executes more accurate focus detection calculation by executing shading compensation on the basis of vignetting information with which a vignetting state can be inferred for each focus detection signal.

FIGS. 10C, 10D, 11A, and 11B illustrate a pupil partition state on the exit pupil surface when the image blur compensation optical system 109 of the lens shift type image blur compensation unit 104 is driven in the X direction. In the embodiment, the first focus detection pixel 201 and the second focus detection pixel 202 included in the image sensor 102 are arrayed in the X axis direction. Accordingly, driving of the image blur compensation optical system 109 included in the lens shift type image blur compensation unit 104 in the X direction has a considerable influence on the pupil partition for the focus detection.

In the imaging optical system 101, the lens shift type image blur compensation unit 104 executes the image blur compensation by shifting one concave lens (the image blur compensation optical system 109) disposed closer to the image surface side than the aperture on the XY plane. That is, when the image blur compensation optical system 109 is driven in the +X direction, the image sensor 102 observes the exit pupil 400 shifted in the −X direction on the pupil surface. Accordingly, FIGS. 10C and 10D illustrate the pupil partition state when the image blur compensation optical system 109 is driven in the +X direction. FIGS. 11A and 11B illustrate a pupil partition state when the image blur compensation optical system 109 is driven in the −X direction.

An example of pupil partition at the central image height when the image blur compensation optical system 109 included in the lens shift type image blur compensation unit 104 is displaced in the +X direction will be described with reference to FIGS. 10C and 10D. As described above, when the image blur compensation optical system 109 is displaced in the +X direction, the exit pupil 400 moves in the −X direction. Strictly speaking, the exit pupil 400 is an elliptical shape by the cosine fourth power law. However, in this example, the exit pupil 400 is expressed as having a circular shape to facilitate the description.

In FIG. 10C, the exit pupil 400 moves in the −X direction, but no vignetting occurs due to the retention frame 110 of the final group of the imaging optical system 101 indicated by the bold lines. However, since the opening shape of the aperture moves in the −X direction, the pupil partitions is right and left unequal, and thus shading by vignetting occurs at the central image height. In FIG. 10D, when the exit pupil 400 moves in the −X direction, vignetting occurs due to the retention frame 110 of the final group of the imaging optical system 101 like FIG. 10C. Even in this case, a vignetting amount increases unlike FIG. 10B, but the pupil partition has a shape closer to a right and left equal shape than in FIG. 10C.

A pupil partition state at the central image height and the peripheral image height (the +X direction) when the image blur compensation optical system 109 included in the lens shift type image blur compensation unit 104 is displaced in the −X direction will be described with reference to FIGS. 11A and 11B. When the image blur compensation optical system 109 of the lens shift type image blur compensation unit 104 is displaced in the −X direction in contrast to FIGS. 10C and 10D, the exit pupil 400 moves in the +X direction. The exit pupil 400 is assumed to be circular to facilitate the description. In FIG. 11A, the exit pupil 400 moves in the +X direction, but no vignetting occurs due to the retention frame 110 of the final group of the imaging optical system 101 indicated by the bold lines. However, since the exit pupil 400 moves in the +X direction, the pupil partition is right and left unequal and shading by the vignetting occurs at the central image height. In FIG. 11B, vignetting occurs due to the retention frame 110 of the final group of the imaging optical system 101 and the exit pupil 400 moves in the +X direction. In this case, a vignetting amount decreases unlike FIG. 10B, but the pupil partition is further unequal and a component ratio of the focus detection signal on the −X side is considerably reduced. When defocus calculation is executed using the same shading compensation or conversion factor K as the condition of FIGS. 10A and 10B under the condition corresponding to FIGS. 10C to 11B, accurate focus detection may not be possible and an in-focus state may not be achieved.

From the above description, it can be understood that a ratio between two focus detection signals in accordance with the vignetting amount or the pupil partition is changed at the position of the image blur compensation optical system 109 on the XY plane and the setting of the focus detection region when the image blur compensation is executed using the lens shift type image blur compensation unit 104. When the ratio between the two focus detection signals is considerably changed during storing the focus detection signals in the focus detection, a variation in the shading compensation coefficient SHD or the conversion factor K increases, and thus a good accurate focus detection result may not be obtained. Accordingly, for example, the image blur compensation control unit 107 calculates how the shading compensation coefficient SHD and the conversion factor K are changed in accordance with the vignetting information stored in the memory unit 106 in advance when the image blur compensation optical system 109 moves from a current position. The image blur compensation control unit 107 executes the image blur compensation in which the good accurate focus detection can be realized by executing allocation control on the basis of a calculation result of the change in the shading compensation coefficient SHD and the conversion factor K. In the following description, the allocation control refers to controlling a ratio (weight) of the driving amount of the image blur compensation optical system 109 using the lens shift type image blur compensation unit 104 to the driving amount of the image sensor 102 using the sensor shift type image blur compensation unit 105.

Sensor Shift and Pupil Partition

Figure 12A:
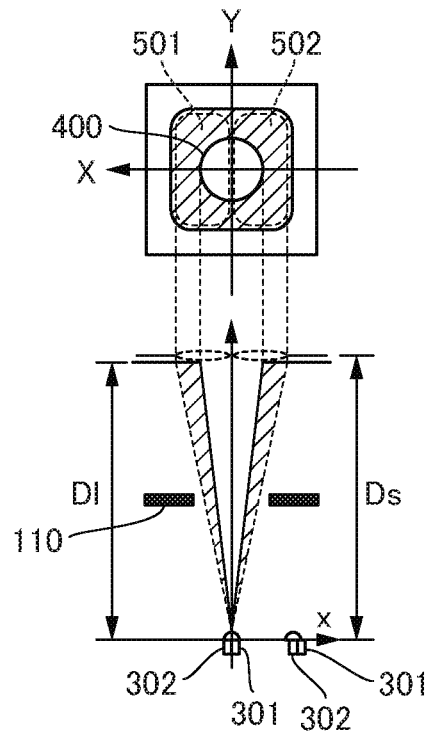
FIGS. 12A to 12D are diagrams illustrating examples of the pupil partition state on the exit pupil surface.
Figure 12B:
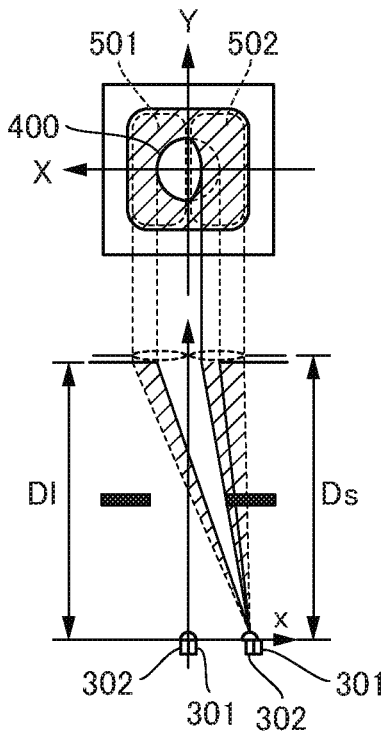
Figure 12C:
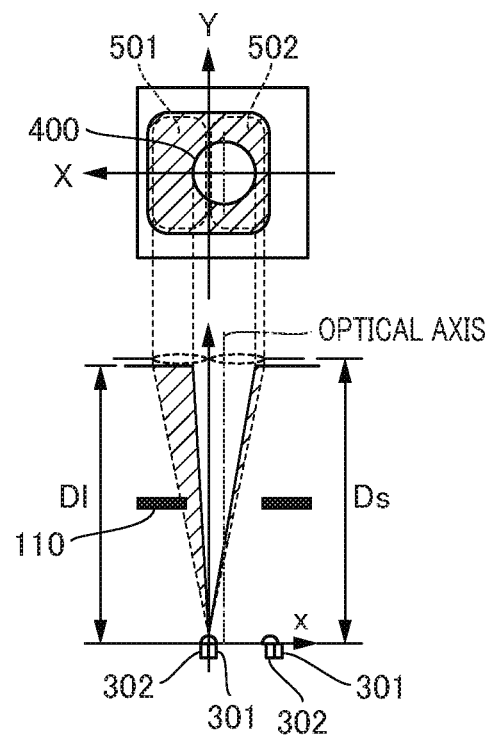
Figure 12D:
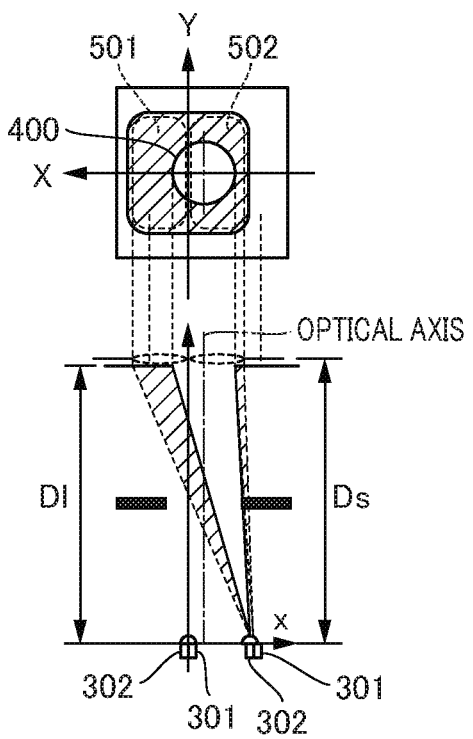
Figure 13A:
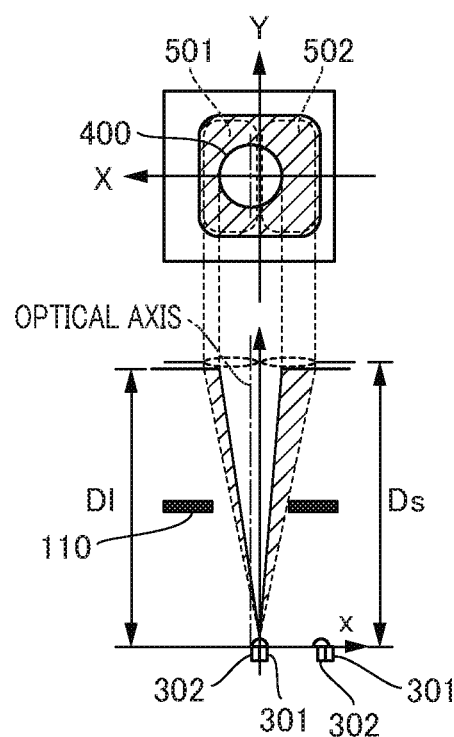
FIGS. 13A and 13B are diagrams illustrating examples of the pupil partition state on the exit pupil surface.
Figure 13B:
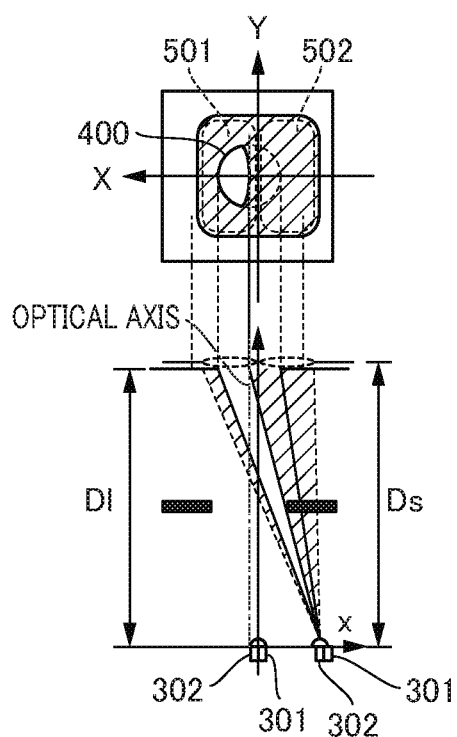

FIGS. 12A, 12C, and 13A illustrate pupil partition states on the exit pupil surface which is observed by the pixel group of the focus detection region at the central image height. FIGS. 12B, 12D, and FIG. 13B illustrate a pupil partition state on the exit pupil surface which is observed by the pixel group of the focus detection region at the peripheral image height (the +X direction). FIGS. 12A to 13B illustrate a system in which the exit pupil distance Dl of the imaging optical system 101 is substantially equal to the setting pupil distance Ds of the image sensor 102.

Pupil partition at the central image height when the sensor shift type image blur compensation unit 105 is located in the middle of the driving range will be described with reference to FIG. 12A. A circular shape show n at the middle of the exit pupil surface on the upper side of FIG. 12A is the exit pupil 400 formed by the opening of the aperture of the imaging optical system 101. At the central image height, a light flux on the exit pupil surface of the imaging optical system 101 at substantially the same distance as the setting pupil distance of the image sensor 102 is substantially equally partitioned to the right and left. Bold lines disposed between the exit pupil surface and the surface of the image sensor 102 indicate the retention frame 110 of the final group of the imaging optical system 101. At the central image height, no vignetting occurs due to the retention frame 110.

As illustrated in FIG. 12B, even at the peripheral image height, the setting pupil distance of the image sensor 102 is substantially the same as the exit pupil distance of the imaging optical system 101. When there is no retention frame 110 of the final group, the light flux on the exit pupil surface of the imaging optical system 101 can be substantially equally partitioned to the right and left. However, actually, one light flux causes vignetting due to the retention frame 110 of the final group and the pupil partition may be right and left unequal. When the vignetting is caused, the imaging apparatus 1000 executes more accurate focus detection calculation by executing shading compensation on the basis of vignetting information with which a vignetting state can be inferred for each focus detection signal.

FIGS. 12C, 12D, 13A, and 13B illustrate a pupil partition state on the exit pupil surface when the sensor shift type image blur compensation unit 105 is driven in the X direction. The sensor shift type image blur compensation unit 105 can drive the image sensor 102 within the XY plane. In the embodiment, the first focus detection pixel 201 and the second focus detection pixel 202 included in the image sensor 102 are disposed in the X axis direction. Accordingly, driving the image sensor 102 included in the sensor shift type image blur compensation unit 105 in the X direction has a considerable influence on the pupil partition for the focus detection. When image sensor 102 is driven in the +X direction, the image sensor 102 observes the exit pupil 400 shifted in the +X direction on the pupil surface. Accordingly, FIGS. 12C and 12D illustrate the pupil partition when the image sensor 102 is driven in the +X direction. FIGS. 13A and 13B illustrate pupil partition when the image sensor 102 is driven in the +X direction.

An example of pupil partition at the central image height when the sensor shift type image blur compensation unit 105 is displaced in the −X direction will be described with reference to FIGS. 12C and 12D. When the image sensor 102 is displaced in the −X direction, the exit pupil 400 also moves in the −X direction on the pupil surface. This is because when the image sensor 102 is displaced in the −X direction, an axis vertical to the imaging surface passing through the center of the image sensor 102 (equivalent to a vertical arrow extending from a middle pixel) deviates from the optical axis of the imaging optical system 101. Accordingly, on the exit pupil surface, as illustrated on the upper sides of FIGS. 12C and 12D, all the first pupil partial region 501 and the second pupil partial region 502 are expressed as a movement shape on the exit pupil surface (the left side in the drawings). Strictly speaking, the exit pupil 400 is an elliptical shape by the cosine fourth power law. However, in this example, the exit pupil 400 is expressed as having a circular shape to facilitate the description.

In FIG. 11C, the exit pupil 400 moves in the −X direction, but no vignetting occurs due to the retention frame 110 of the final group of the imaging optical system 101 indicated by the bold lines. However, since the exit pupil 400 moves in the −X direction, the pupil partitions is right and left unequal, and thus shading by vignetting occurs at the central image height. In FIG. 12D, when the exit pupil 400 moves in the −X direction, vignetting occurs due to the retention frame 110 of the final group of the imaging optical system 101 like FIG. 12C. In this case, since the optical axis of the imaging optical system 101 is relatively close to the position of the image sensor 102 at the peripheral image height focused on in FIG. 11D, a vignetting amount further decreases than in FIG. 12B and the pupil partition is a shape closer to the shape of FIG. 12C.

A pupil partition example at the central image height and the peripheral image height (the +X direction) when the image sensor 102 included in the sensor shift type image blur compensation unit 105 is displaced in the +X direction will be described with reference to FIGS. 13A and 13B. When the image sensor 102 is displaced in the +X direction, the exit pupil 400 also moves in the +X direction on the pupil surface. This is because when the image sensor 102 is displaced in the +X direction, the axis perpendicular to the imaging surface passing through the center of the image sensor 102 (equivalent to a vertical arrow extending from a middle pixel) deviates from the optical axis of the imaging optical system 101. Accordingly, on the exit pupil surface, as illustrated on the upper sides of FIGS. 13A and 13B, all the first pupil partial region 501 and the second pupil partial region 502 are expressed as a movement shape on the exit pupil surface (the right side in the drawings). In this example, the exit pupil 400 is also expressed as having a circular shape to facilitate the description.

In FIG. 13A, the exit pupil 400 moves in the +X direction, but no vignetting occurs due to the retention frame 110 of the final group of the imaging optical system 101 indicated by the bold lines. However, since the exit pupil 400 moves in the +X direction, the pupil partitions is right and left unequal, and thus shading by vignetting occurs at the central image height. In FIG. 13B, the optical axis of the imaging optical system 101 is relatively distant from the position of the image sensor 102 focused on in FIG. 13A at the peripheral image height. However, vignetting considerably occurs due to the retention frame 110 of the final group of the imaging optical system 101 and the exit pupil 400 moves in the +X direction. In this case, unlike FIG. 12B, a vignetting amount decreases, but the pupil partition becomes further unequal and the component ratio of the focus detection signal on the −X side becomes almost zero. When defocus calculation is executed using the same shading compensation or conversion factor K as the condition of FIGS. 12A and 12B under the condition corresponding to FIGS. 12C to 13B, accurate focus detection may not be possible and an in-focus state may not be achieved.

From the above description, it can be understood that a ratio between two focus detection signals is changed in accordance with the vignetting amount or the pupil partition at the position of the image sensor 102 and the setting of the focus detection region when the image blur compensation is executed using the sensor shift type image blur compensation unit 105. When the ratio between the two focus detection signals is considerably changed during storing the focus detection signals in the focus detection, a good accurate focus detection result may not be obtained. Accordingly, for example, the image blur compensation control unit 107 calculates how the shading compensation coefficient SHD and the conversion factor K are changed in accordance with the vignetting information stored in the memory unit 106 in advance when the image sensor 102 moves from a current position. The image blur compensation control unit 107 executes the image blur compensation in which more optimum focus detection can be realized by executing allocation control on the basis of a calculation result of the change in the shading compensation coefficient SHD and the conversion factor K.

The example in which the exit pupil distance Dl of the imaging optical system 101 is substantially equal to the setting pupil distance Ds of the image sensor 102 has been described with reference to FIGS. 10A to 13B. Since the imaging apparatus 1000 is a lens interchangeable digital camera, a combination of Dl>Ds or Dl<Ds actually also occurs. In this case, a vignetting situation may be different from the situations in FIGS. 10A to 13B. Accordingly, for example, the memory unit 106 is caused to retain vignetting information that also includes information regarding the exit pupil distance Dl of the imaging optical system 101 and select conditions in which optimum focus detection can be realized through allocation control to be described below.

Allocation Control

Figure 14:
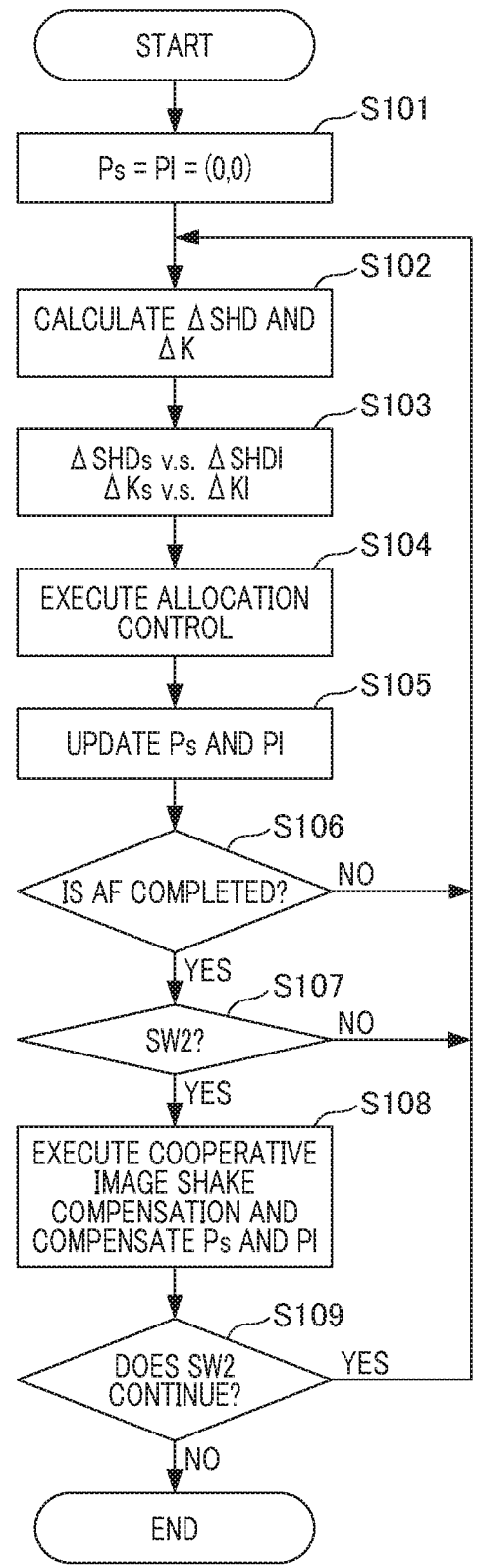
FIG. 14 is an explanatory diagram illustrating allocation control of a lens shift type image blur compensation unit and a sensor shift type image blur compensation unit.

FIG. 14 is a flowchart illustrating driving control of a lens shift type image blur compensation unit and a sensor shift type image blur compensation unit executed by the image blur compensation control unit.

A process described with reference to FIG. 14 is executed after the imaging apparatus 1000 is in a live view state and a half-push of a release button (an instruction to start photometry/focus detection: SW1) is executed for still image photographing. In the embodiment, the image blur compensation control unit 107 controls driving amounts of the lens shift type image blur compensation unit 104 and the sensor shift type image blur compensation unit 105 such that a change in vignetting is equal to or less than a predetermined value during a period of the focus detection. In FIG. 14, still image continuous shooting will be described as an example.

In S101, the image blur compensation control unit 107 sets Pl and Ps with reference to information regarding the current positions of the lens shift type image blur compensation unit 104 and the sensor shift type image blur compensation unit 105. Pl indicates a position of the image blur compensation optical system 109 included in the lens shift type image blur compensation unit 104 at the XY coordinates. Ps indicates the position of the image sensor 102 included in the sensor shift type image blur compensation unit 105 at XY coordinates. In the embodiment, booth Pl and Ps are set to (0,0) since the image blur compensation starts from the SW1 operation.

In S102, the image blur compensation control unit 107 calculates a changing amount ΔSHD of the shading compensation coefficient SHD, which is a difference between the currently referred shading compensation coefficient SHD and the shading compensation coefficient SHD when the image blur compensation optical system 109 and the image sensor 102 are driven in the ±X direction.

And, In S102, the image blur compensation control unit 107 calculates a change amounts ΔK of the conversion factor K, which is a difference between the currently referred conversion factor K and the conversion factor K when the image blur compensation optical system 109 and the image sensor 102 are driven in the ±X direction.

Subsequently, in S103, the image blur compensation control unit 107 executes calculation to determine which is preferentially driven between the lens shift type image blur compensation unit 104 and the sensor shift type image blur compensation unit 105 on the basis of ΔSHD and ΔK obtained in S102. That is, calculation is executed to determine a case in which ΔSHD and ΔK are greater between a case in which the image blur compensation optical system 109 is driven in the +X (or −X) direction and a case in which the image sensor 102 is driven in the −X (or +X) direction. More specifically, the image blur compensation control unit 107 calculates whether ΔSHDs>ΔSHDl and ΔKs>ΔKl are satisfied for each driving direction. The image blur compensation control unit 107 may calculate a case in which ΔSHD is greater between the case in which the image blur compensation optical system 109 is driven and the case in which the image sensor 102 is driven. The image blur compensation control unit 107 may also calculate in which case ΔK is greater between the case in which the image blur compensation optical system 109 is driven and the case in which the image sensor 102 is driven.

Subsequently, in S104, the image blur compensation control unit 107 executes the allocation control on the driving amounts of the lens shift type image blur compensation unit 104 and the sensor shift type image blur compensation unit 105 based on a calculation result of S103. For example, when ΔSHDl is greater than ΔSHDs, the image blur compensation control unit 107 drives the image sensor 102 with the sensor shift type image blur compensation unit 105. In this example, a scheme of driving only the sensor shift type image blur compensation unit 105 is adopted. Of course, the invention is not limited to this scheme. The driving amount of the sensor shift type image blur compensation unit 105 may be set to be greater than the driving amount of the lens shift type image blur compensation unit 104. In this case, a ratio of driving allocation may be determined consideration of an angle change amount of a principal ray when each image blur compensation unit is driven, that is, sensitivity of the change amount of an image blur compensation angle. In the embodiment, by preferentially driving a system in which ΔSHD and ΔK are less and executing image blur compensation, it is possible to suppress changes in the shading compensation coefficient SHD and the conversion factor K to be small during the period in which the image sensor 102 stores charges subjected to photoelectric conversion for the focus detection. A system in which one of ΔSHD and ΔK is less may preferentially be driven and the image blur compensation may be executed. When the focus detection is executed on the basis of the focus detection signals stored during image blur compensation driving, the average shading compensation coefficient SHD or conversion factor K for a storage time is used. Accordingly, by executing the allocation control of the image blur compensation unit, it is possible to prevent a variation in the shading compensation coefficient SHD and the conversion factor K for the storage time. The allocation control executed in the embodiment means that the image blur compensation is executed in a state in which a change in the vignetting amount of the focus detection signal is as small as possible as a result.

Subsequently, in S105, the image blur compensation control unit 107 updates Pl and Ps. Subsequently, in S106, the image blur compensation control unit 107 determines whether the focus detection by the focus detection unit 103 has been completed. When it is determined that the focus detection is not completed, the process returns to S102 and the processes from S102 to S105 in which the focus detection operation is preferred are repeatedly executed. While the processes from S102 o S105 are repeated, Pl and Ps are updated in sequence, calculation regarding ΔSHD and ΔK is executed, and the image blur compensation control is executed along with the focus detection operation. When it is determined that the focus detection is completed, the process proceeds to S107. A period in which the charges subjected to the photoelectric conversion by the image sensor 102 are stored in order for the focus detection unit 103 to execute the focus detection is located at least once during a period until the focus detection is determined to be completed in S106 from the start of the process flow.

Subsequently, in S107, the image blur compensation control unit 107 determines whether a full-push operation of a release button (an instruction to start imaging: SW2) is executed. When SW2 is not detected, the process returns to S102. When SW2 is detected, the process proceeds to S108. In S108, cooperative image blur compensation is executed. That is, during an exposure period for imaging, the lens shift type image blur compensation unit 104 and the sensor shift type image blur compensation unit 105 cooperate to execute the image blur compensation for imaging. When the cooperative image blur compensation is executed, ΔSHD and ΔK are not referred to. During the cooperative image blur compensation, Ps and Pl are also frequently updated for subsequent focus detection. When the imaging is completed, the image blur compensation control unit 107 determines in S109 whether SW2 continues. The determination process of S109 is a process of confirming an intention of continuous shooting. When SW2 continues, the process returns to S102 again and driving allocation control of the image blur compensation operation of preferring the focus detection operation and the focus detection operation for a subsequent frame is executed. When SW2 does not continue, the process flow ends and the series of image blur compensation driving operations are completed.

The process flow illustrated in FIG. 14 starts in accordance with SW1, but the invention is not limited thereto. The process flow may normally be executed from start of the live view operation. In FIG. 14, the continuous shooting in the capturing of still images has been described, but the invention is not limited thereto. The process flow may be applied from start of the live view operation or start of imaging in a moving image photographing mode. In the moving image photographing, an instruction to image a subsequent frame is forcibly given with no instruction to execute imaging equivalent to SW2 or no focus detection completion, and then the focus detection is executed on the subsequent frame.

In the process flow of FIG. 14, both ΔSHD and ΔK are calculated and referred to, but the invention is not limited thereto. For example, the ratio of the allocation control may be determined with reference to only ΔK or only ΔSHD. This is because the shading compensation coefficient SHD and the conversion factor K in accordance with vignetting have correlation under many conditions. Whether the allocation control is executed may be determined on the basis of one of ΔSHD and ΔK under an image height, an exit pupil distance condition, or the like. This is because the correlation between the shading compensation coefficient SHD and the conversion factor K is broken by the vignetting depending on a condition such as an image height or an exit pupil distance condition.

For example, when there is no considerable influence despite driving of any of the lens shift type image blur compensation unit 104 and the sensor shift type image blur compensation unit 105, that is, the change in ΔK or ΔSHD is equal to or less than a predetermined amount, the following control may be executed. For example, the image blur compensation control unit 107 drives the lens shift type image blur compensation unit 104 and the sensor shift type image blur compensation unit 105 at the same ratio.

When ΔSHD or ΔK is greater than the predetermined value despite the driving of any image blur compensation unit, the driving of the lens shift type image blur compensation unit 104 and the sensor shift type image blur compensation unit 105 may be limited. For example, the image blur compensation control unit 107 appropriately executes a centering operation of the two image blur compensation units and causes ΔSHD and ΔK to be less than predetermined values. Thus, it is possible to prevent the focus detection precision from being damaged, as much as possible.

In the imaging apparatus according to the embodiment, the allocation control of the image blur compensation in which the changes of the shading compensation coefficient SHD and the conversion factor K are small or equal to or less than the predetermined values on the basis of the vignetting information is executed. Accordingly, it is possible to appropriately control driving of the image sensor and the image blur compensation optical system for the image blur compensation and suppress an influence on the focus detection.

OTHER EMBODIMENTS

The invention can also be realized through processes of supplying a program realizing one or more functions of the above-described embodiment to a system or an apparatus via a network or a memory medium and causing one or more processors in a computer of the system or the apparatus to read and execute the program. The invention can also be realized by a circuit (for example, ASIC) realizing one more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-149675 filed on Aug. 2, 2017, which are hereby incorporated by reference herein in its entirety.

What is claimed is:

1. An imaging apparatus comprising:
   a focus detection unit configured to execute focus detection based on a phase difference between image signals obtained through photoelectric conversion of a light flux passing through different pupil partial regions of an imaging optical system including a first image blur compensation unit configured to compensate for image blur;
   a second image blur compensation unit configured to compensate for image blur; and
   a control unit that controls driving of the first image blur compensation unit and the second image blur compensation unit,
   wherein the control unit controls a driving amount of the first image blur compensation unit and a driving amount of the second image blur compensation unit such that a change in vignetting occurring in the light flux passing through the imaging optical system is equal to or less than a predetermined value during a period in which the focus detection unit executes the focus detection.

2. The imaging apparatus according to claim 1, further comprising:
a memory unit configured to store information regarding the vignetting occurring in the light flux passing through the imaging optical system in accordance with a position at which the image blur compensation unit is driven,
wherein the control unit controls the driving amount of the first image blur compensation unit and the driving amount of the second image blur compensation unit based on the information regarding the vignetting such that the change in the vignetting is equal to or less than the predetermined value.

3. The imaging apparatus according to claim 2,
wherein the information regarding the vignetting includes information regarding a light flux shape on an exit pupil surface of the imaging optical system in accordance with a state of the vignetting.

4. The imaging apparatus according to claim 2,
wherein the information regarding the vignetting includes information regarding an intensity ratio of the plurality of image signals or information regarding a conversion factor for converting the phase difference between the plurality of image signals into a defocus amount.

5. The imaging apparatus according to claim 4,
wherein the information regarding the vignetting includes information regarding an intensity ratio between the plurality of image signals or information regarding a conversion factor for converting the phase difference between the plurality of image signals into a defocus amount, and
wherein the control unit controls the driving amount of the first image blur compensation unit and the driving amount of the second image blur compensation unit based on a change amount of the conversion factor or a change amount of the intensity ratio between the image signals when the first image blur compensation unit and the second image blur compensation unit are driven.

6. The imaging apparatus according to claim 5,
wherein, of the first image blur compensation unit and the second image blur compensation unit, the control unit preferentially drives the image blur compensation unit for which the change amount of the intensity ratio between the image signals or the change amount of the conversion factor at the time of driving the image blur compensation unit is small.

7. The imaging apparatus according to claim 5,
wherein, of the first image blur compensation unit and the second image blur compensation unit, the control unit causes the driving amount of the image blur compensation unit for which the change amount of the intensity ratio between the image signals or the change amount of the conversion factor is small at the time of driving the image blur compensation unit to be greater than the driving amount of the image blur compensation unit for which the change amount of the intensity ratio between the image signals or the change amount of the conversion factor is large.

8. The imaging apparatus according to claim 5,
wherein the control unit drives the first image blur compensation unit and the second image blur compensation unit at the same ratio when the change amount of the intensity ratio between the image signals or the change amount of the conversion factor is equal to or less than a predetermined amount despite the driving of either the first image blur compensation unit or the second image blur compensation unit.

9. The imaging apparatus according to claim 5,
wherein the control unit limits the driving of the first image blur compensation unit and the second image blur compensation unit when the change amount of the intensity ratio between the image signals or the change amount of the conversion factor is greater than a predetermined amount despite the driving of either the first image blur compensation unit or the second image blur compensation unit.

10. The imaging apparatus according to claim 1,
wherein the first image blur compensation unit includes a lens, and
wherein the second image blur compensation unit includes an image sensor.

11. A control method of an imaging apparatus having a second image blur compensation unit which compensates for image blur, the control method comprising:
executing focus detection based on a phase difference between image signals obtained through photoelectric conversion of a light flux passing through different pupil partial regions of an imaging optical system including a first image blur compensation unit which compensates for image blur; and
controlling driving of a first image blur compensation unit and a second image blur compensation unit,
wherein, in the controlling of the driving, a driving amount of the first image blur compensation unit and a driving amount of the second image blur compensation unit are controlled such that a change in vignetting occurring in the light flux passing through the imaging optical system is equal to or less than a predetermined value during a period in which the focus detection is executed in the execution of the focus detection.

12. A non-transitory storage medium on which is stored a computer program for making a computer execute a control method, the control method comprising:
executing focus detection based on a phase difference between image signals obtained through photoelectric conversion of a light flux passing through different pupil partial regions of an imaging optical system; and
controlling driving of a first image blur compensation unit and a second image blur compensation unit,
wherein, in the controlling of the driving, a driving amount of the first image blur compensation unit and a driving amount of the second image blur compensation unit are controlled such that a change in vignetting occurring in the light flux passing through the imaging optical system is equal to or less than a predetermined value during a period in which the focus detection is executed in the execution of the focus detection.

* * * * *